(12) United States Patent
Farrington (10) Patent No.: US 6,329,910 B1
(45) Date of Patent: Dec. 11, 2001

(54) VEHICLE IMPACT DETECTION APPARATUS AND METHOD

(75) Inventor: Andrew Roy Farrington, Coventry (GB)

(73) Assignee: Breed Automotive Technology, Inc., Lakeland, FL (US)

( * ) Notice: Subject to any disclaimer, the term of this patent is extended or adjusted under 35 U.S.C. 154(b) by 0 days.

(21) Appl. No.: 09/514,072

(22) Filed: Feb. 26, 2000

(30) Foreign Application Priority Data

Mar. 1, 1999 (GB) ................................................ 9904605

(51) Int. Cl.[7] .................................................... B60Q 1/00
(52) U.S. Cl. .......................... 340/436; 340/435; 340/903; 180/282; 280/735; 701/301
(58) Field of Search .................... 340/435, 436, 340/438, 439, 903; 180/282; 280/735; 701/301

(56) References Cited

U.S. PATENT DOCUMENTS

| | | | |
|---|---|---|---|
| 4,249,632 | 2/1981 | Lucchini et al. | 180/274 |
| 5,580,084 | 12/1996 | Gioutsos | 280/735 |
| 5,739,757 | 4/1998 | Gioutsos | 340/667 |
| 5,767,766 | 6/1998 | Kwun | 340/436 |
| 6,031,449 * | 2/2000 | Laporte et al. | 340/436 |

FOREIGN PATENT DOCUMENTS

WO 9718108    5/1997   (WO) .

* cited by examiner

Primary Examiner—Daryl Pope
(74) Attorney, Agent, or Firm—Lonnie Drayer (57) ABSTRACT

A vehicle impact detection apparatus has a sensor for sensing impact of an object against a vehicle. A safety device, such as an external airbag or a deployable hood is actuatable on receipt of a firing signal from the sensor. The vehicle impact detection apparatus has a magnetostrictive sensor and a stress-conducting member in the form of an elongate metal bar in the lower air dam area of the bumper of the vehicle. The signal from the sensor is analyzed to determine information about the impact.

22 Claims, 11 Drawing Sheets

VEHICLE IMPACT DETECTION APPARATUS AND METHOD

FIELD OF THE INVENTION

The invention relates to a vehicle impact detection apparatus and method.

1. Background of the Invention

Vehicle safety has been a major issue since the 1960's and numerous measures have been introduced to improve the safety of vehicles. The focus of vehicle safety improvements has been to lessen the risk of serious injury to vehicle occupants. Measures such as the compulsory wearing of seatbelts, use of airbag systems, provision of crumple zones and the existence of a "survival cell" in a vehicle has much improved the chance of a vehicle occupant escaping an accident without serious injury. Nevertheless, concern has recently been expressed regarding the safety of vehicles in relation to pedestrians and other vulnerable road users, such as cyclists or motorcyclists.

2. Discussion of the Prior Art

A sensor preferably determines the location on the vehicle that is impacted by an object and the type of object being impacted. In such a case, the sensor may be arranged to send a firing signal in the event of an impact with a vulnerable road user and not send a firing signal in the event of an impact with a less vulnerable object, for example another vehicle.

The sensor is preferably a magnetostrictive sensor. Magnetostrictive sensors have been proposed for sensing vehicle impacts to initiate vehicle occupant protection systems. U.S. Pat. No. 5,580,084 relates to a system for controlling actuation of a vehicle safety device comprising a magnetostrictive sensor connected via a signal processor to the safety device. U.S. Pat. No. 5,767,766 relates to an apparatus for monitoring the vehicular impact using magnetostrictive sensors.

SUMMARY OF THE INVENTION

A sensor may be arranged adjacent a part of the body of a vehicle. The body part may include a stress-conducting member. The sensor may be arranged adjacent the stress-conducting member. The stress-conducting member is preferably elongate. Most preferably the stress-conducting member is arranged to conduct stress waves along its length. In that way, stress waves are conducted from the point of impact directly to the sensor without dissipating into the vehicle body. The stress-conducting member may be ferromagnetic. Alternatively, part of the body adjacent the sensor may be rendered ferromagnetic.

The stress-conducting member is most preferably included in a bumper or door of the vehicle. Where the bumper or door is made from a plastic material, the stress-conducting member may be insert molded into the bumper. The stress-conducting member may comprise a strengthening bar in the bumper or door. Most preferably the strengthening bar is enclosed within the lower air dam of the bumper.

The safety device may be an airbag arranged to deploy externally of the vehicle so as to cushion the impact of the object against the vehicle. The safety device may comprise means to deploy the hood of the vehicle upwardly from its normal position.

Data acquired from magnetostrictive sensors can be used to determine crash severity and crash characteristics.

According to a third aspect of the invention there is provided a vehicle impact detection apparatus comprising a magnetostrictive sensor, a stress-conducting member arranged on or forming part of the body of the vehicle, the sensor being arranged to sense stress waves in the stress-conducting member and provide a signal to signal analysis means which analyzes the signal from the sensor to determine information about the impact.

The vehicle impact detection apparatus may be arranged to determine the type of object impacted by the vehicle. In particular, the vehicle impact detection apparatus may determine whether the impacted object is a vulnerable road user.

Alternatively, the vehicle impact detection apparatus may determine the characteristics of the crash to enable decisions to be taken regarding vehicle occupant protection systems. The information received from a magnetostrictive sensor is data rich and the type of crash can be identified by analyzing that data. That enables a control unit to determine which, if any of the vehicle safety systems should be deployed. For example, in a side impact only the side airbags may be deployed or depending upon the crash characteristics front and side airbags may need to be deployed. In another embodiment the detection apparatus supplies data to identify whether the impacted object is a "vulnerable road user" to determine whether external vehicle safety systems of the type described above should be deployed.

The stress-conducting member may be a body part of the vehicle. Alternatively, the stress-conducting member may comprise a separate strain element.

The stress-conducting member is preferably elongate so that stress waves caused by impact with an object are conducted to the sensor without significant dissipation thereof. The nature of the elongate stress-conducting member provides a characteristic response to impacts of similar type dependent on where the impact occurs along the stress-conducting member. As mentioned above the stress conducting member may be ferromagnetic or part of the body of vehicle adjacent the sensor may be ferromagnetic.

The separate strain element may be located in a bumper or door of the vehicle. Where the bumper or door is made from a plastic material, the strain element may be insert molded into the bumper or door. The strain element preferably comprises a strengthening bar, most preferably in the lower air dam of the bumper structure.

According to another aspect of the invention there is provided a method of analyzing an impact of a vehicle comprising the steps of providing a magnetostrictive sensor on a vehicle providing a stress-conducting member arranged on or forming part of a vehicle, providing signal analysis means, arranging the sensor adjacent the stress-conducting member, sensing stress waves in the stress-conducting member, providing a signal to the signal analysis means, analyzing the signal to determine information about the impact.

Preferably the signal analysis means comprises spectral analysis means. In that way, the frequency spectrum of the signal can be analyzed and the type of crash, location of crash or type of object impacted can be determined. The location of the impact along the stress-conducting member can be determined by analysis of the frequency spectrum. At the point of impact the frequency spectrum comprises a high proportion of high frequency waves. As the waves move along the stress-conducting member the waves are attenuated into lower frequency waves. Thus the frequency spectrum further away from the impact point includes a higher proportion of lower frequency waves. Accordingly it is possible to assess the distance along the stress-conducting member that the wave energy has traveled to reach the sensor.

Additionally, analysis of wave amplitude and spectrum can give information about the characteristics of the crash including revealing data about the type of object impacted.

BRIEF DESCRIPTION OF THE DRAWINGS

An embodiment of the invention will now be described in detail by way of example and with reference to the accompanying drawings.

DETAILED DESCRIPTION OF THE INVENTION

Figure 1:
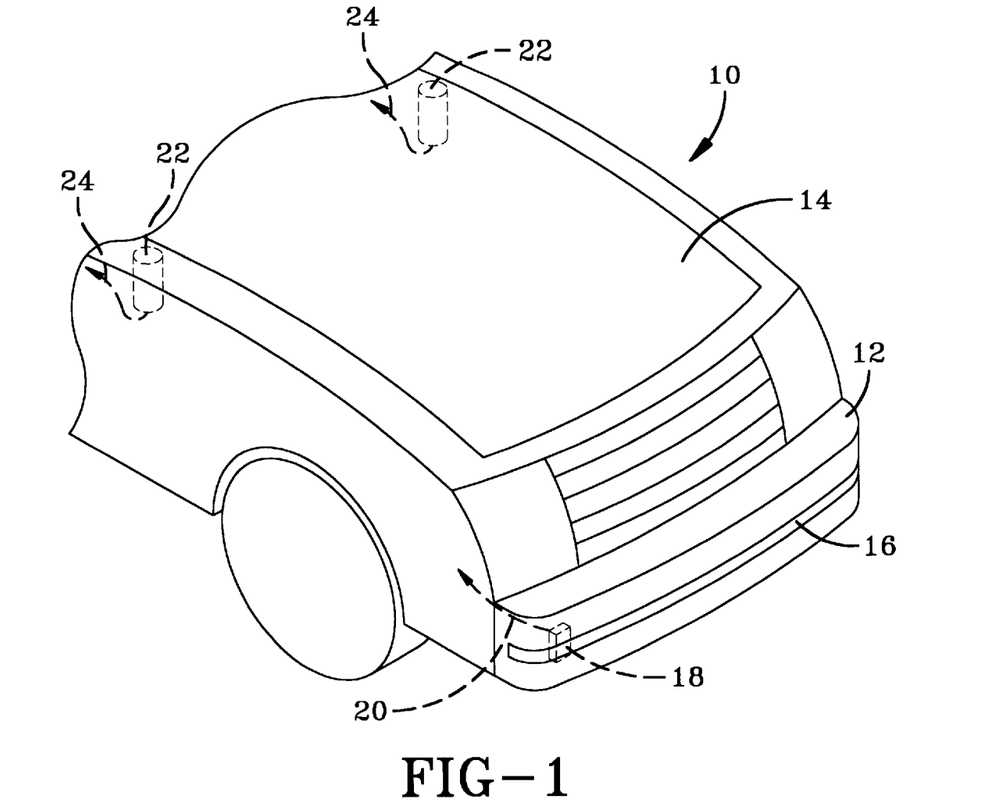
FIG. 1 is a perspective view of part of the front of a passenger vehicle.
Figure 2:
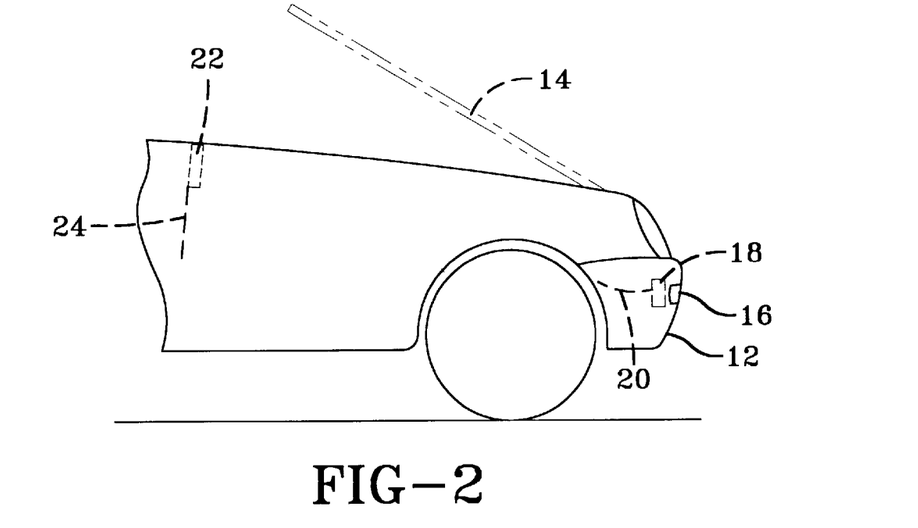
FIG. 2 is a side elevation of the vehicle of FIG. 1.

In FIG. 1, a passenger vehicle 10 has a front bumper 12 and a hood 14. The bumper 12 includes an elongate metal bar 16 in the lower air dam area of the bumper. A magnetostrictive sensor 18 is mounted adjacent to or in contact with the bar 16 and is connected to a central vehicle safety control unit (not shown) via a signal line 20.

The function of the magnetostrictive sensor is described in detail in U.S. Pat. No. 5,580,084 and U.S. Pat. No. 5,767,766 which are incorporated herein by reference for the purpose of teaching the structure and function of magnetostrictive sensors that may be used in the practice of the present invention. The magnetostrictive sensor relies on the magnetostrictive effect, in particular, the "Villari" effect. The "Villari" effect occurs when a time varying stress or strain is applied to a ferromagnetic material under an established magnetic field. The stress changes the magnetic characteristics of the material, which, in turn, causes a change in magnetic flux, which can be detected by an induction coil. The magnetostrictive sensor is a passive device; in other words it requires no power source, with a broad frequency response ranging from a few hertz to a few hundred kilohertz. The magnetostrictive sensor comprises an induction coil arranged around a permanent magnet. The sensor 18 is arranged close to or in contact with the metal bar 16. Since the metal bar is ferromagnetic, application of stress to the bar that is time varying or transient will result in changes in the magnetic flux that can be detected by the induction coil. Signals from the induction coil are passed along the line 20 to the vehicle safety system control unit. The signal from the sensor 18 is processed by the control unit to determine whether an appropriate impact has occurred. The signal processing is described in more detail below.

In the embodiment of FIG. 1 the hood 14 of the vehicle 10 is provided with two pyrotechnic actuators 22, each of which are connected to the vehicle safety system controller via lines 24. In the event of an object impacting the front bumper, the signal from the sensor 18 is passed to the vehicle safety system control unit, which makes a "fire/no fire" decision. If the control unit determines that the object being impacted requires the external safety system, or systems, of the vehicle to be activated then a firing signal is sent down lines 24 to the pyrotechnic actuators 22. The pyrotechnic actuators 22 push the hood 14 of the vehicle open by a small amount, for example 10 cm, so as to provide a space between the surface of the hood and the engine beneath the hood. During a vehicle impact with a pedestrian, serious head injury is often caused to the pedestrian by the impact of the pedestrian's head against the engine beneath the hood after the hood has been deformed by the impact of the pedestrian. The present system elevates the hood above the engine so as to provide a space between the relatively compliant hood and the rigid engine. The hood must deform through a substantial amount in plastic deformation before any part of the pedestrian impacts the rigid surface below the hood. Such plastic deformation substantially reduces the loading on a pedestrian's body in the event of an impact and thus reduces the likelihood of serious injury.

Figure 3:
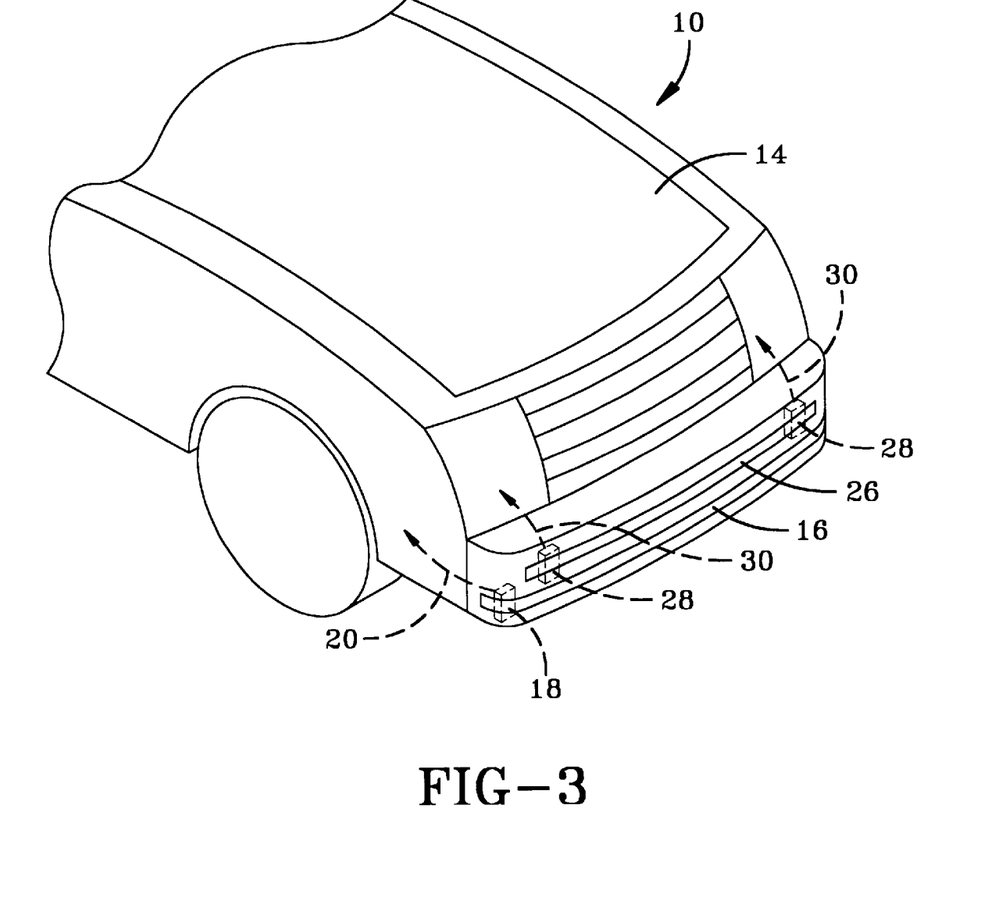
FIG. 3 is a perspective view of a second vehicle having a safety system in accordance with the invention.

In the embodiment shown in FIG. 3, the vehicle 10 is substantially identical to that shown in FIG. 1 with the exception that an elongate airbag assembly 26 is provided along the front bumper with an airbag inflator device 28 arranged at each end thereof. Each inflator device 28 is connected to the vehicle safety system control unit via line 30. Thus, in the event of an impact with a pedestrian or other vulnerable road user the signal from sensor 18 is passed to the control unit via line 20 and the control unit takes a "fire/no fire" decision. In the event of a "fire" decision, a firing signal is sent through the line 30 to the airbag inflators 28 that inflate the airbag 26. The airbag 26 may simply be an elongate tube that cushions the impact of the pedestrian against the bumper. Alternatively, the airbag may be arranged to deploy a substantial distance upwardly of the vehicle so as to provide a "mattress" to absorb the impact of the pedestrian against the hood of the vehicle.

The safety systems of FIGS. 1 and 3 may be combined so as to provide an airbag cushion for cushioning impact and a deployable hood to provide a survival space between the deployed hood and the engine.

As mentioned above, when the stress in a ferromagnetic material changes over time the magnetic characteristics of the ferromagnetic material also change. The magnetostrictive sensor employs this effect to generate a signal in an induction coil relating to the change in magnetic flux experienced by the ferromagnetic material. The magnetostrictive sensor can be applied to a non-ferrous material such as a plastic providing a thin layer of ferromagnetic material is plated or bonded to the material surface in the local area where the sensor is to be placed. The sensor requires no direct physical contact or coupling to the material in order to sense the stresses applied to the material. In the event of an impact against a vehicle impact stresses propagate through the vehicle. The stress is transmitted in two fashions. First, a high frequency, high-speed longitudinal stress wave is generated and secondly a lower frequency, slower travelling flexural or transverse wave is produced. The waves travel along the ferromagnetic material and are not attenuated to the same extent as the waves travelling through the body panel of the vehicle. Accordingly, an appropriately placed magnetostrictive sensor can sense a crash or impact event at a location remote from the sensor as long as an adequate path for propagation of the stress wave is provided. In the present invention the path is provided by means of an elongate strip along the front bumper and, in particular, a strengthening bar in the lower air dam of the bumper is employed. It will be appreciated that any stress-propagating strip could be used. For example, a ferromagnetic strip of material could be incorporated within the body of the bumper itself or within the body of the vehicle elsewhere in the vehicle. The strengthening bar merely provides a convenient stress propagating or stress-conducting member which already exists in the vehicle and which requires little or no modification to incorporate the present invention.

It should be noted that the magnetostrictive sensor senses both longitudinal and transverse waves which provides an information rich data stream in the event of an impact so as to allow better analysis of the impact type.

The present invention is particularly directed but not exclusively limited to discriminating between impact of a motor vehicle with inanimate objects and impact with pedestrians or other vulnerable road users. The primary characteristic of a pedestrian impact or an impact with another vulnerable road user, for example a cyclist or motorcyclist, is that the impact is a low inertia impact rather than the high inertia impact experienced when colliding with, for example a wall or another large vehicle. In the event of a high inertial impact the object being impacted probably does not require external safety systems of the vehicle to be deployed. When a vulnerable road user, for example a pedestrian, cyclist, animal or motorcyclist is impacted it is important to deploy the external safety systems of the vehicle as described above relating to FIGS. 1 and 3. Accordingly, it is necessary to distinguish between the two types of impacts so that a "fire/no fire" decision can be made by the vehicle safety system control unit. As mentioned above, impact with vulnerable road users are generally low inertia impacts and so the amplitude of the signal produced by the magnetostrictive sensor is generally lower. However, simply distinguishing between high and low amplitude signals is not sufficient since a high-speed impact with a pedestrian will create a higher amplitude than a low speed impact with a concrete post, for example. The vehicle safety system control unit is provided with analysis means to analyze the spectrum of the signal received at the sensor. In the event that a signal is provided by the sensor which is above a predetermined threshold and which meets particular impact characteristics the vehicle safety system control unit sends a firing signal to the vehicle external safety systems. Additionally, it may be necessary to send a firing signal or sequence of signals to the interior vehicle safety systems, for example an interior airbag or airbags.

The advantage of the location of the sensor 18 relative to the bumper strengthening bar 16 and the use of the bumper strengthening bar 16 of the stress-conducting member is that a single magnetostrictive sensor can be used to determine the location of the impact along the bar. In the event of an impact the longitudinal and transverse propagating wave can be said to radiate from an notional center point outwardly in all directions until they reach the edge of the component which has been impacted, for example in the present case the bumper 12. The waves reflect off the interface and create noise. Also, as the waves radiate, the stresses are attenuated and absorbed by the material itself. The provision of an elongate strip of material, in the present case the bumper strengthening bar channels a component of the longitudinal and transverse waves into a unidirectional wave.

Figure 4A:
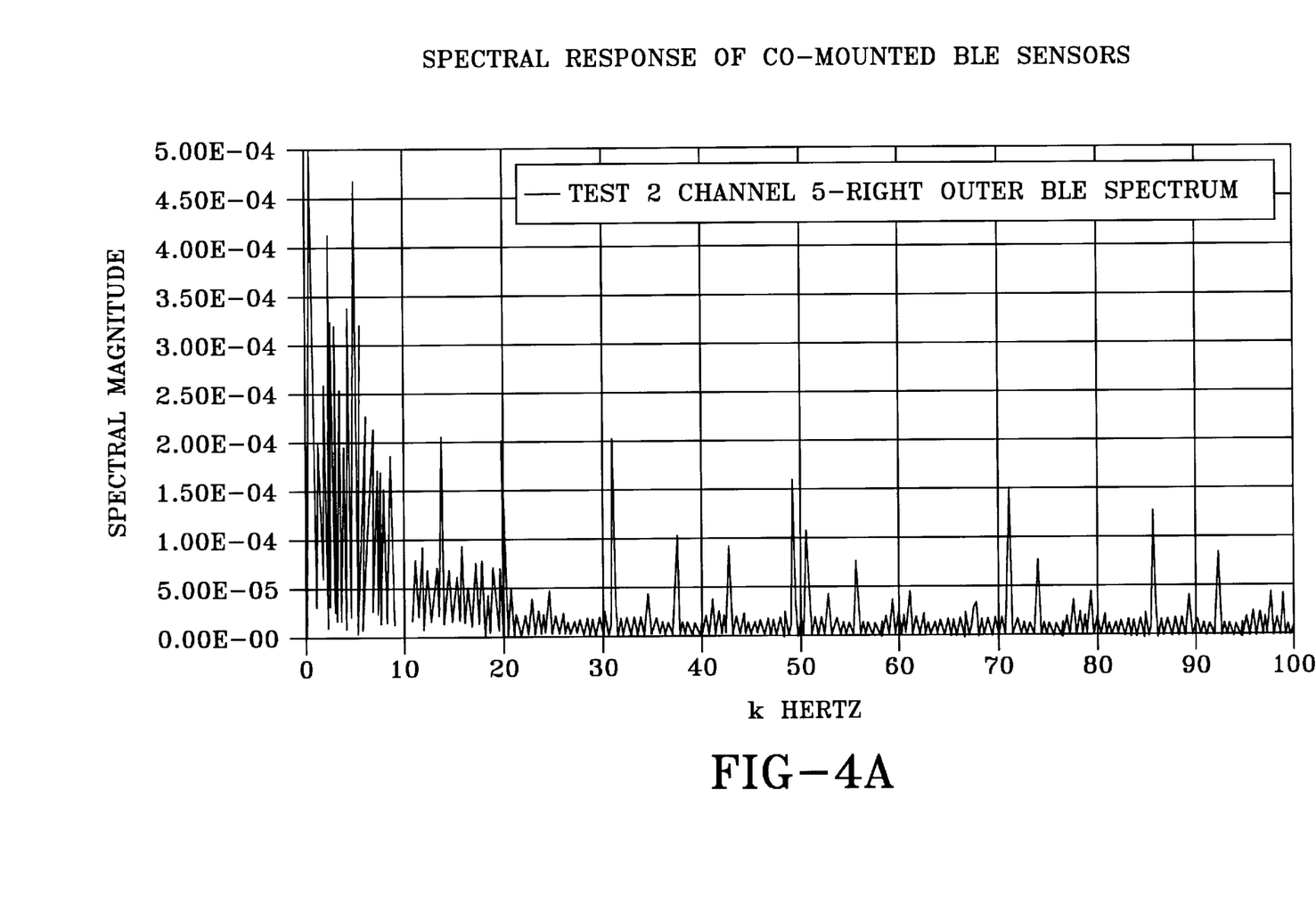
FIGS. 4A, 4B and 4C are graphs showing the spectral response produced by three magnetostrictive sensors mounted at different points along a vehicle bumper in an impact with a dummy pedestrian legform.
Figure 4B:
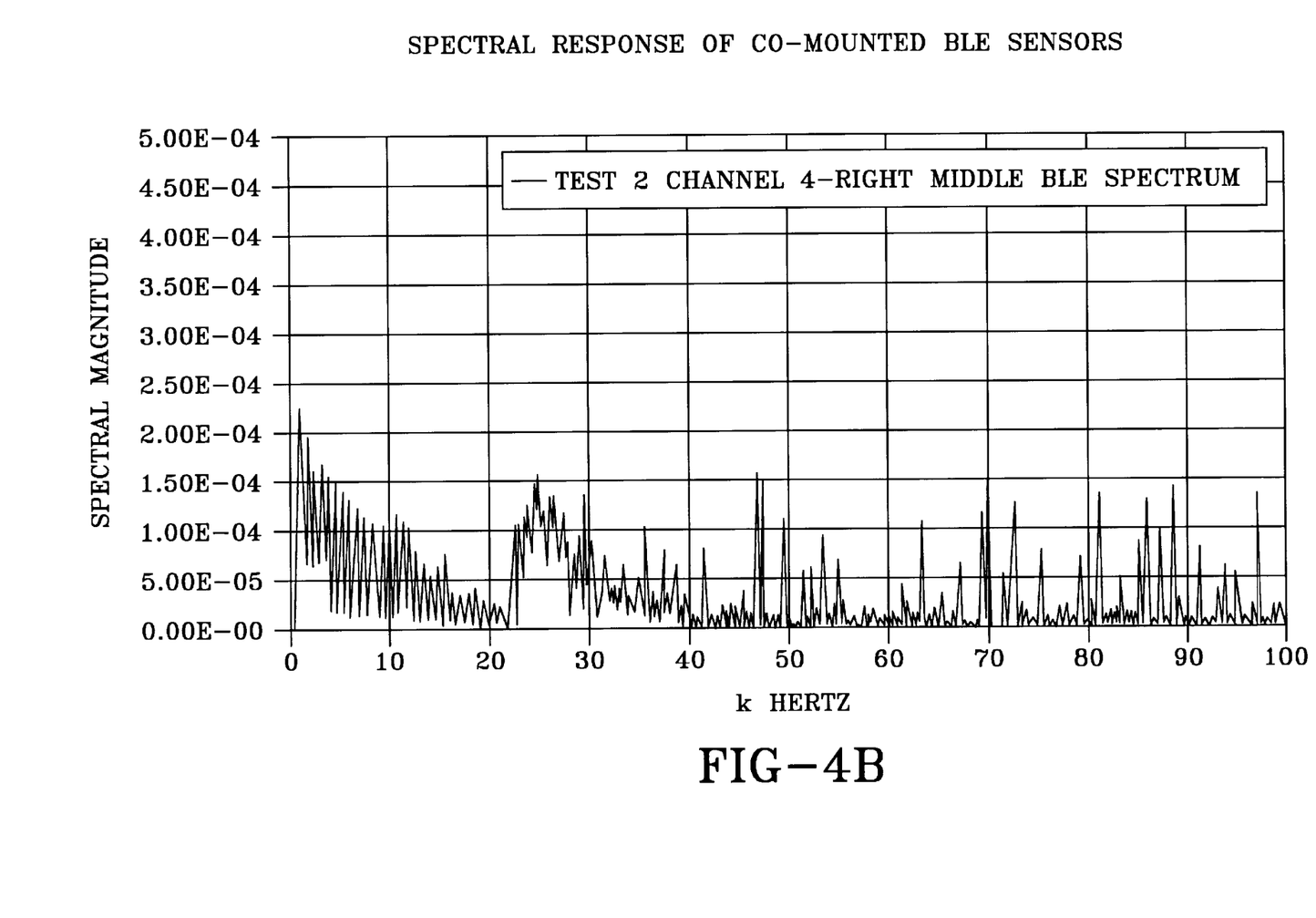
Figure 4C:
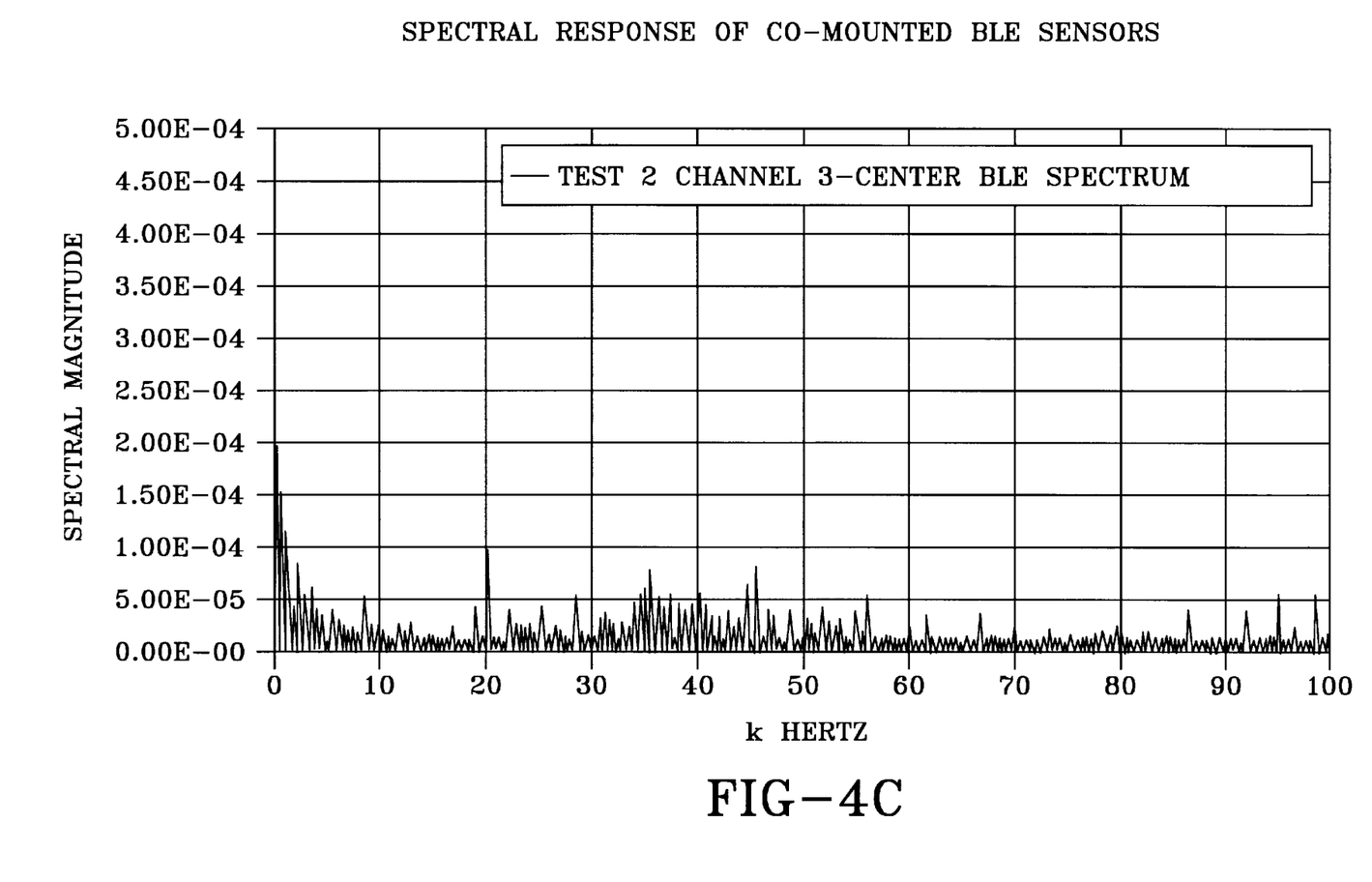
Figure 5A:
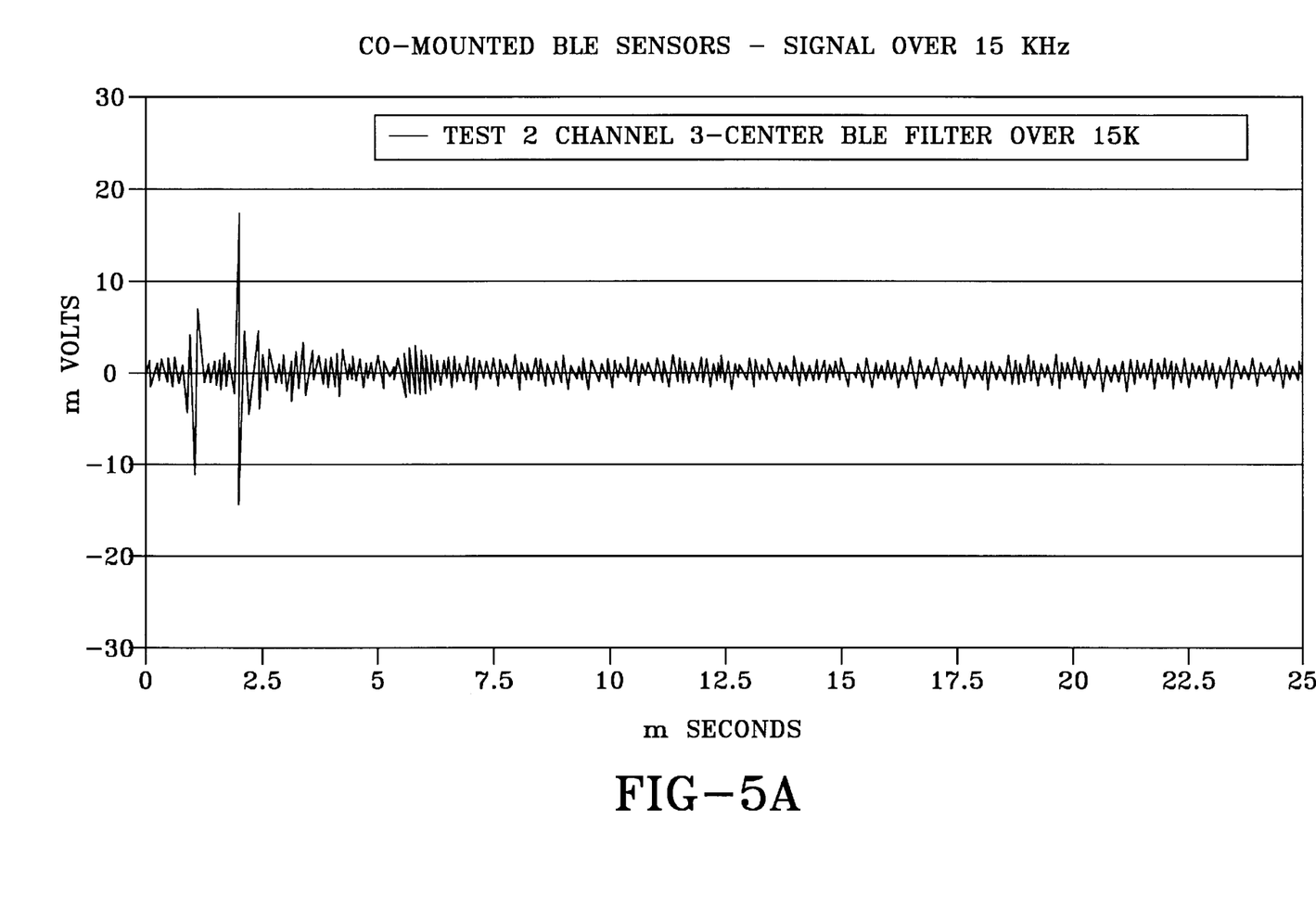
FIGS. 5A, 5B and 5C are graphs showing the signal over 15 kHz received by the three sensors over time.
Figure 5B:
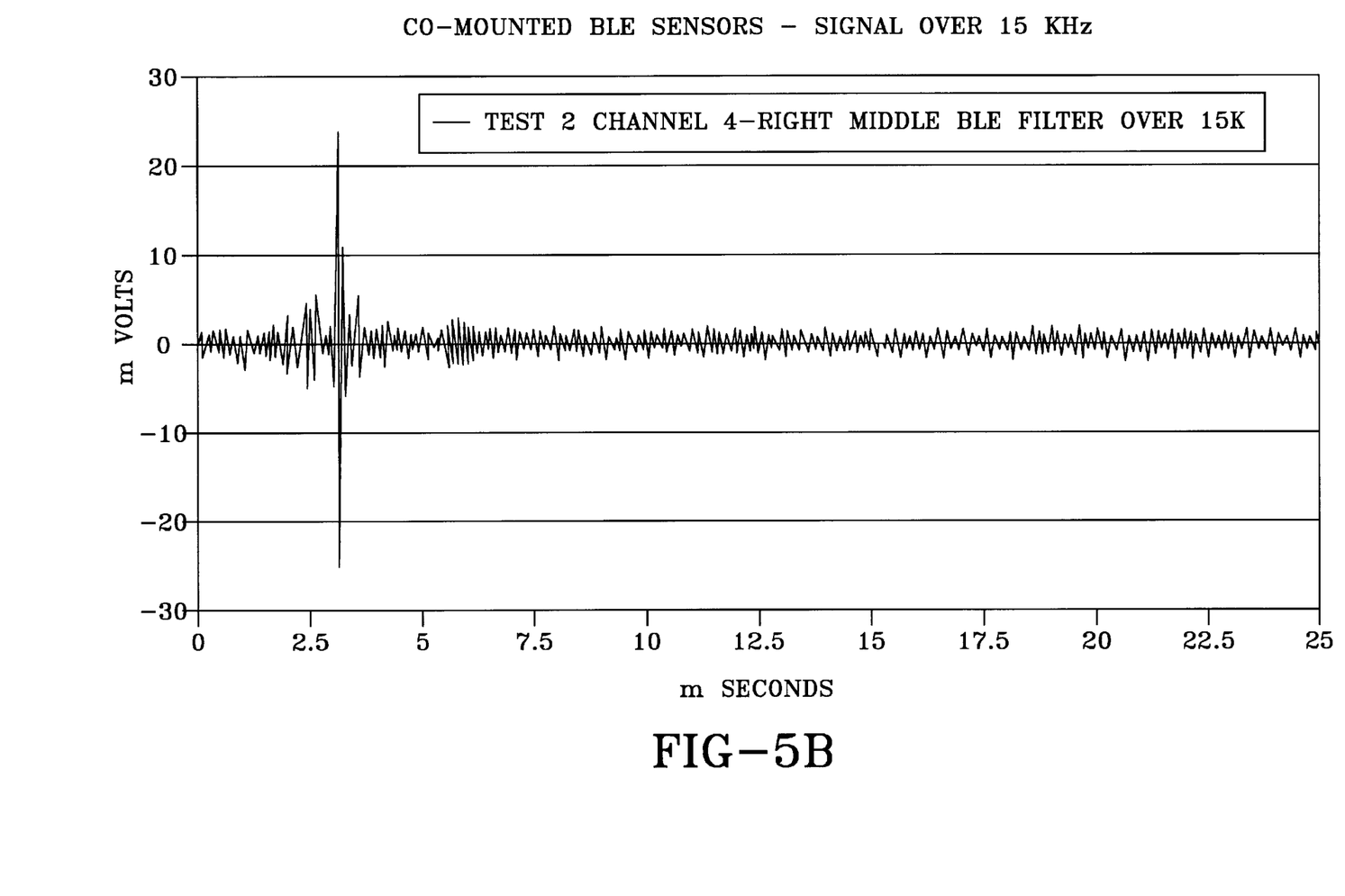
Figure 5C:
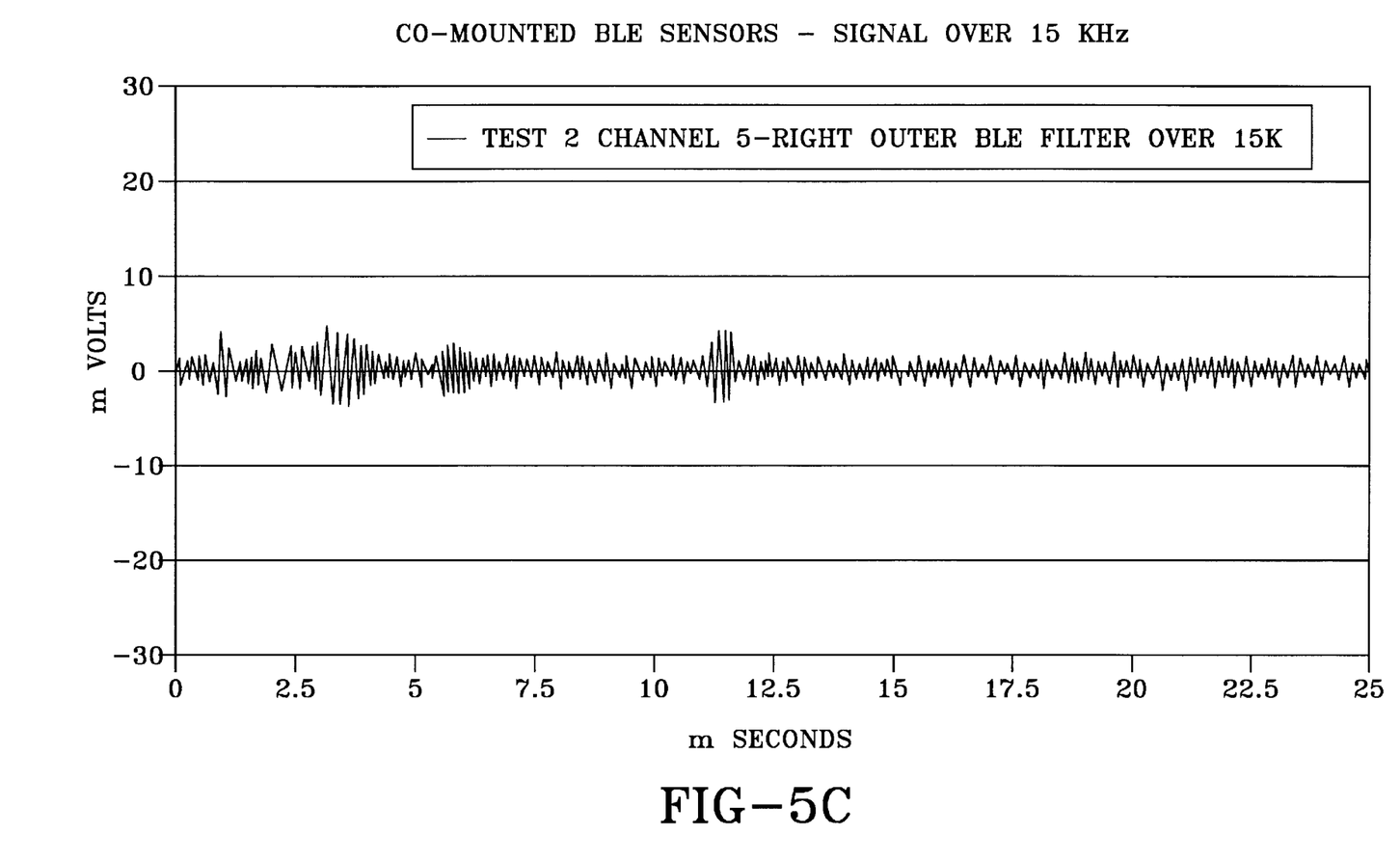
Figure 6A:
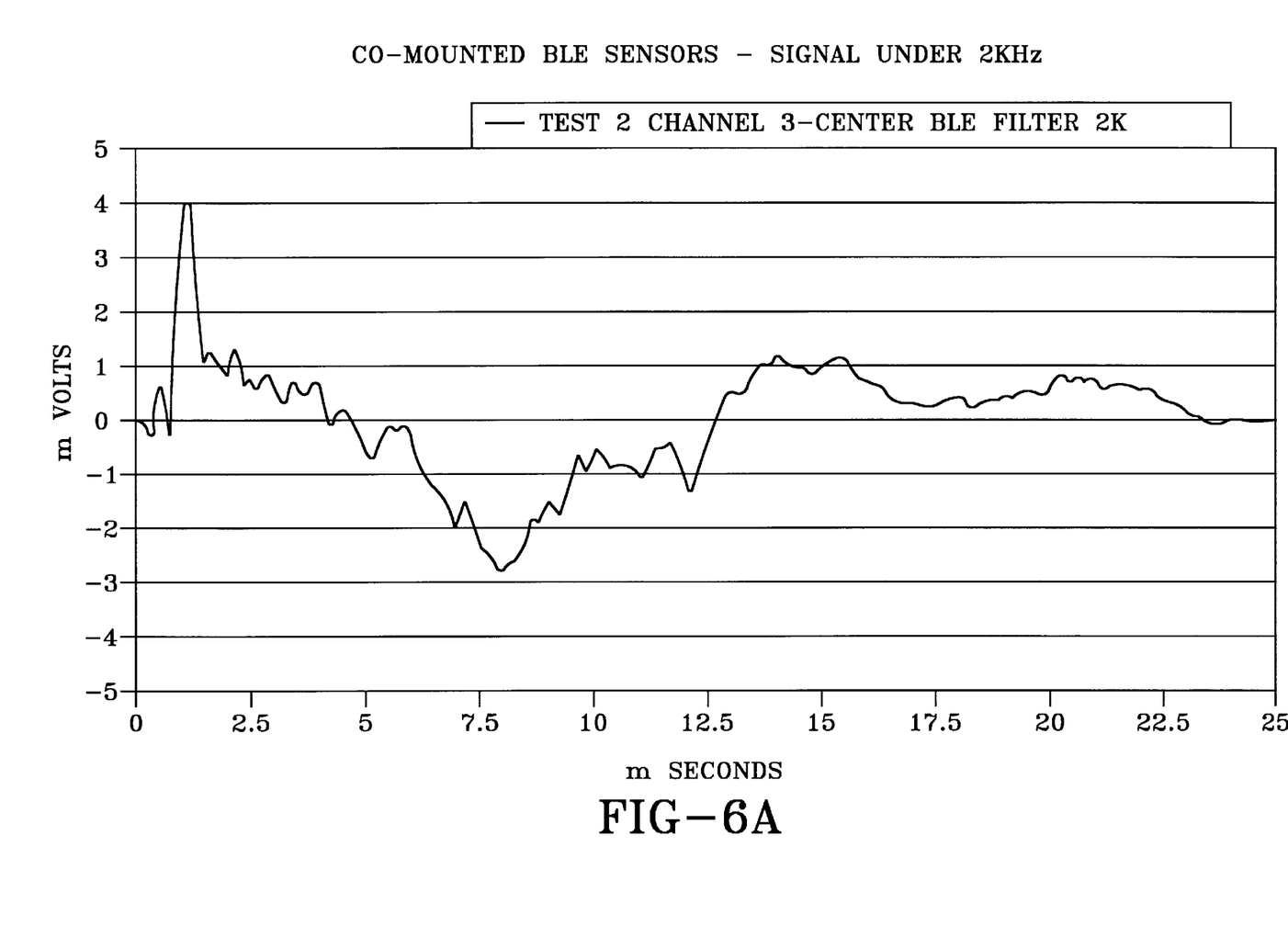
FIGS. 6A, 6B and 6C are graphs showing the signal under 2 kHz received by the three sensors over time.
Figure 6B:
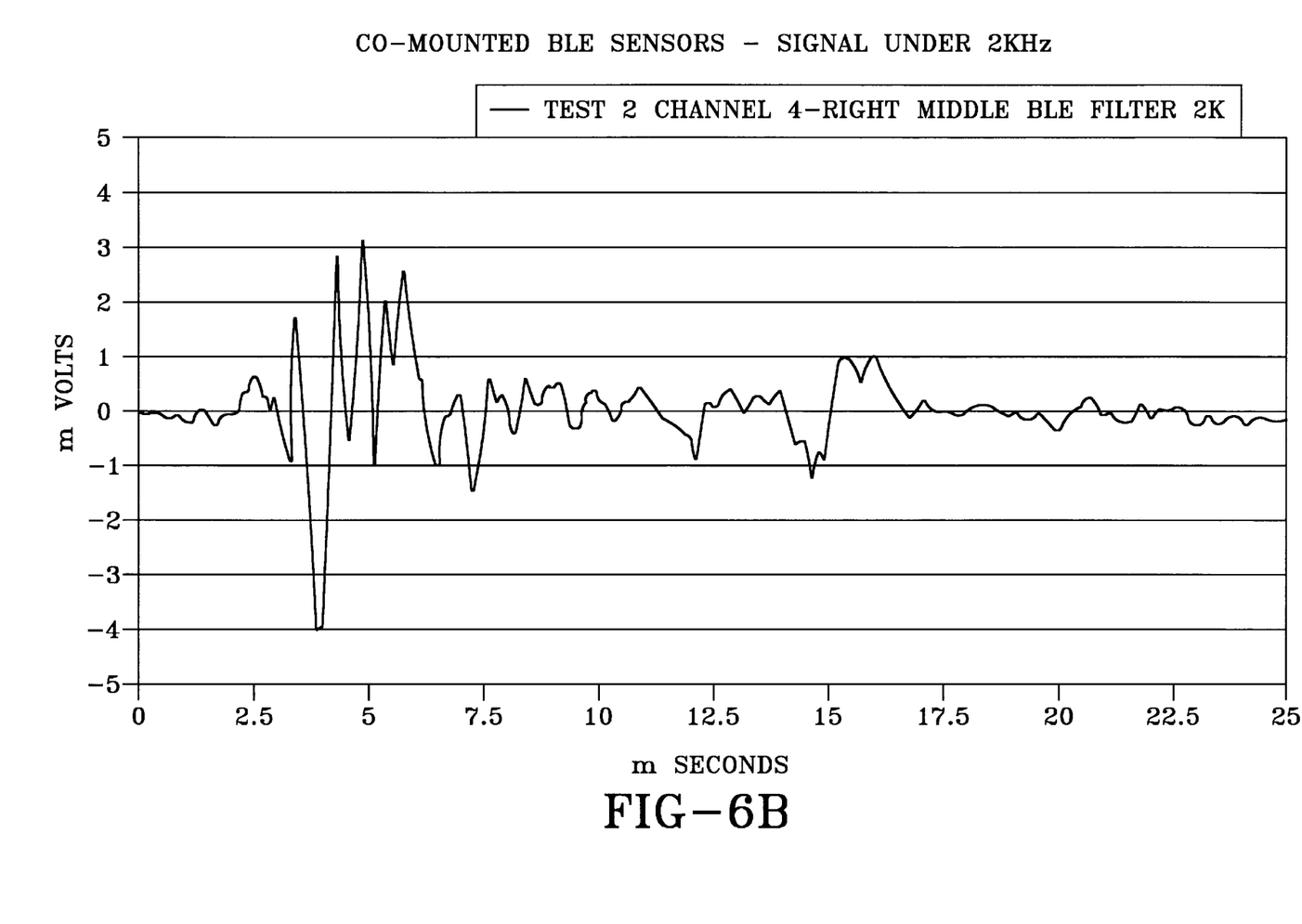
Figure 6C:
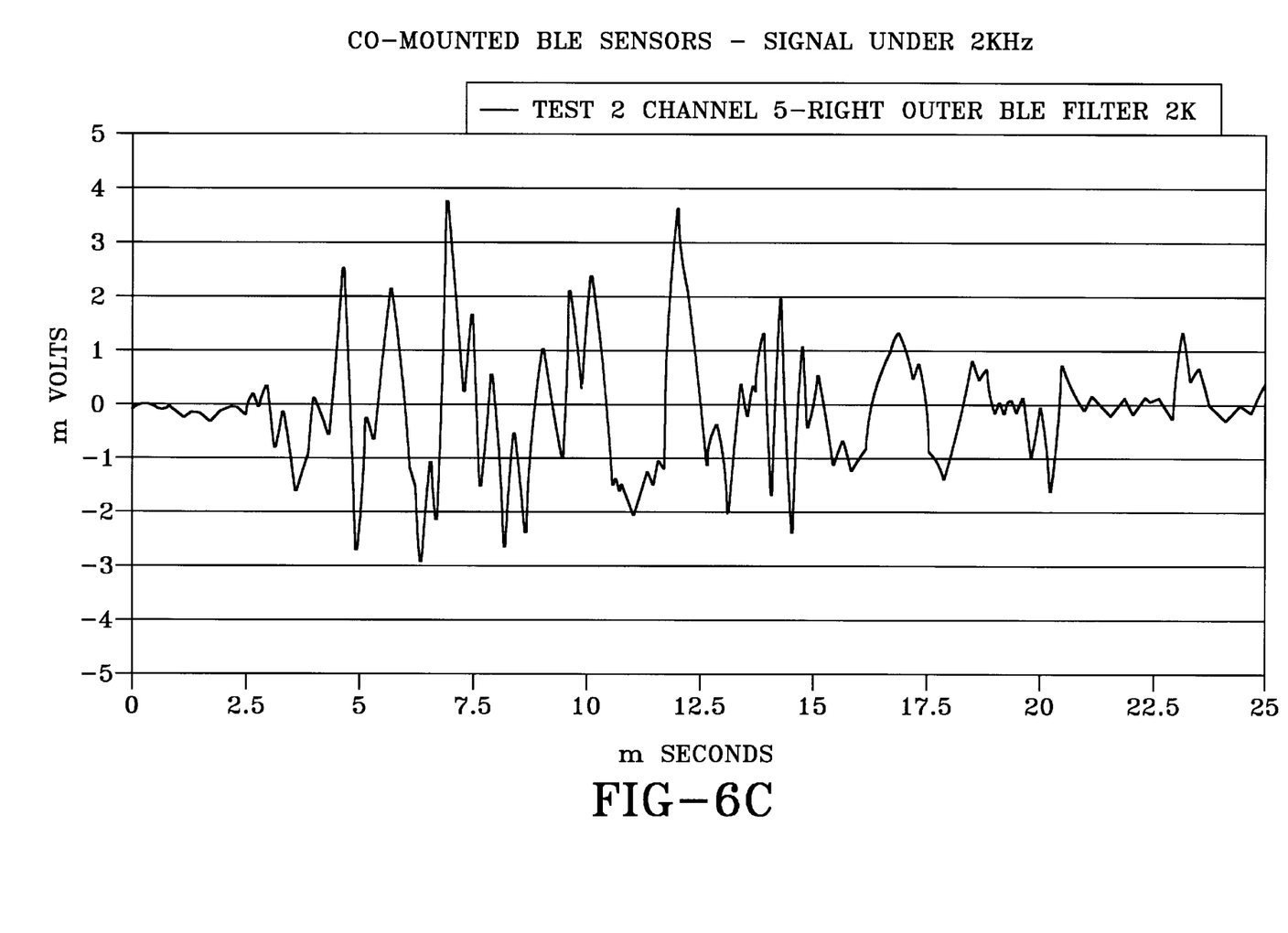

In FIGS. 4A, 4B and 4C the graphs show the spectral response of three sensors mounted at different points across a vehicle bumper in an impact with a dummy pedestrian legform at 48 Kilometers per hour. The three magnetostrictive sensors are mounted at the center of the bumper, at the right middle and the right outer part of the bumper. The impact occurs at the center of the bumper. FIGS. 5A, 5B and 5C show the signals generated by the sensors over 15 KHz against time and FIGS. 6A, 6B and 6C show the signals generated under 2 KHz over time.

In the event of an impact the high-energy longitudinal waves are attenuated as they travel along the stress-conducting member, in this case the bumper strengthening bar and they change into lower frequency transverse waves. Thus, the further from the sensor that the impact occurs along the bar the greater the proportion of lower frequency waves in the frequency spectrum recorded by the sensor. That can clearly be seen in FIGS. 4A, 4b and 4C. In FIG. 4C graph represents the frequency spectrum measured by the central sensor. In FIG. 4B the graph represents the signal generated by the right middle sensor. In FIG. 4A the graph represents the spectrum generated by the right outer sensor. The impact occurred at the center of the bumper and it can clearly be seen that the spectrum produced by the central sensor has a significant portion of high frequency energy from approximately 35 KHz to approximately 55 KHz. The right middle sensor has an energy pulse from approximately 20 KHz to approximately 35 KHz while the right outer sensor which is located at the most remote point from the impact along the bumper has a frequency response which is almost entirely encompassed below 20 KHz. Thus, by the time the stress waves have traveled along the bumper strengthening bar to the right outer sensor the majority of the energy has been attenuated from high frequency waves to lower frequency transverse waves.

That can also be seen in FIGS. 5A, 5B and 5C, which show the response of the three sensors filtered to register only those frequencies over 15 KHz. In FIG. 5C the graph represents the right outer sensor. In FIG. 5B the graph represents the right middle sensor. In FIG. 5A the graph represents the center sensor. The center sensor registers a spike of high frequency energy at approximately 1 millisecond after impact and a further spike at approximately 2 milliseconds after impact. The right middle sensor registers the first spike of high frequency energy at approximately 2.25 milliseconds after impact and a further large spike of high frequency energy at approximately 3 milliseconds after impact. The right outer sensor registers very little high frequency response but a small response is discernible at approximately 3 milliseconds, a further frequency response can be seen at approximately 5 to 6 milliseconds. The further response at approximately 11.5 milliseconds probably represents reflection of the stress waves back along the bar and also the plastic deformation of the bumper.

Accordingly, the frequency spectrum measured by a single sensor adjacent an elongate bar can determine the location along the bar of the impact. That information can then be used to further characterize the type of impact and type of object impacted.

To that effect, the lower frequency information shown in FIGS. 6A, 6B and 6C are helpful. As mentioned above, high speed impact with a pedestrian will produce an amplitude similar to a low speed impact with a concrete post. However, the two impacts will produce quite different wave forms over time and so the analysis means includes a series of algorithms which calibrate the incoming data to determine whether external and/or internal safety systems need to be activated (known as must fire/no fire decisions).

In the present system the calculation of the impact location is important since the wave form produced will be different for the same impacted object depending upon where the impact occurs along the stress-conducting member and so it is necessary to have that information in order to change the calibration parameters of the must fire/no fire algorithm or algorithms so that the signal analysis means can more accurately determine must fire/no fire decisions. For example, a pedestrian impact will produce a different shape of waveform depending upon where along the stress-conducting member the impact occurred. Accordingly, once the location of the impact has been determined the parameters of the must fire/no fire decision in relation to, for example, external vehicle safety systems is altered and the incoming signal from the sensor is fed through the revised parameters of the algorithm of the vehicle safety system control unit. The unit may receive other data, for example vehicle speed and deceleration and the various parameters are used to determine whether or not to fire the external vehicle safety systems.

FIGS. 6A, 6B and 6C show the low frequency response of the three sensors in the event of an impact. It should be noted that the central sensor records a high initial spike of low frequency energy that then oscillates down to about −3 millivolts. The right middle sensor records a severe spike of low frequency energy at around −4 milliseconds and then oscillates back to +3 millivolts. The right outer sensor records an oscillating frequency between +/−3 millivolts from approximately 5 milliseconds right the way across to approximately 15 milliseconds and continues to oscillate significantly more than the center and right middle sensors.

It will be appreciated that the magnetostrictive sensor system provides an information rich data stream during the course of an accident that allows impact location points to be determined. Once the impact location point has been determined, the must fire/no fire algorithms can be customized to render those decisions much more accurate than with existing systems. Once the impact location is known then the various wave forms and crash characteristics that the algorithms are designed to detect can be much more closely monitored. If the impact location is not known the algorithms can not be so closely customized which leaves open the possibility of erroneous must fire decisions and, even more importantly, possibly the making of a "no fire" decision when the safety system should have been activated.

Although the present invention has been described to a certain extent in relation to pedestrian impact it is equally applicable to use the sensor to determine particular crash type, for example side impacts with another vehicle, frontal impact with an inanimate object etc and to activate internal and/or external safety systems accordingly.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

I claim:

1. A vehicle impact detection apparatus for protecting an object external of the vehicle comprising
    a magnetostrictive sensor for sensing the actual occurrence of an impact of an object with a vehicle,
    a control unit for processing data collected from the magnetostrictive sensor about the impact with the object, the control unit determines the location on the vehicle that is impacted by the object and determines if the object is a vulnerable road user, wherein the vulnerable road user is selected from the group consisting of pedestrians, cyclists, animals, and motorcyclists, and
    a safety device actuatable on receipt of a firing signal from the control unit for protecting the vulnerable road user.

2. The vehicle impact detection apparatus for protecting an object external of the vehicle according to claim 1 wherein the sensor is arranged adjacent to a part of the body of the vehicle.

3. The vehicle impact detection apparatus for protecting an object external of the vehicle according to claim 2 wherein the body part includes a stress-conducting member.

4. The vehicle impact detection apparatus for protecting an object external of the vehicle according to claim 3 wherein the sensor is arranged adjacent to the stress-conducting member.

5. The vehicle impact detection apparatus for protecting an object external of the vehicle according to claim 3 wherein the stress conducting member is elongated.

6. The vehicle impact detection apparatus for protecting an object external of the vehicle according to claim 5 wherein the stress conducting member is arranged to conduct stress waves along its length.

7. The vehicle impact detection apparatus for protecting an object external of the vehicle according to claim 3 wherein a part of the vehicle body adjacent to the sensor is ferromagnetic.

8. The vehicle impact detection apparatus for protecting an object external of the vehicle according to claim 3 wherein the stress conducting member is included in a bumper or door of the vehicle.

9. The vehicle impact detection apparatus for protecting an object external of the vehicle according to claim 1 wherein the safety device is an airbag arranged to deploy externally of the vehicle so as to cushion the impact of the object against the vehicle.

10. The vehicle impact detection apparatus for protecting an object external of the vehicle according to claim 1 wherein the safety device comprises means for deploying the hood of the vehicle upwardly from its normal position.

11. A vehicle impact detection apparatus for protecting an object external of the vehicle comprising
    a magnetostrictive sensor for sensing the actual occurrence of an impact of an object with a vehicle,
    a control unit for processing data collected from the magnetostrictive sensor about the impact with the object, and the control unit determines the location on the vehicle that is impacted by the object and determines if the object is a vulnerable road user, wherein the vulnerable road user is selected from the group consisting of pedestrians, cyclists, animals, and motorcyclists, and
    a stress conducting member arranged on or forming part of the body of the vehicle, the sensor being arranged to sense stress waves in the stress conducting member and provide a signal to the control unit.

12. The vehicle impact detection apparatus for protecting an object external of the vehicle according to claim 11 wherein the stress conducting member is a body part of the vehicle.

13. The vehicle impact detection apparatus for protecting an object external of the vehicle according to claim 11 wherein the stress conducting member comprises a separate strain element.

14. The vehicle impact detection apparatus for protecting an object external of the vehicle according to claim 11 wherein the stress conducting member is elongate so that stress waves caused by impact with an object are conducted to the sensor without significant dissipation thereof.

15. The vehicle impact detection apparatus for protecting an object external of the vehicle according to claim 11 wherein the stress conducting member is ferromagnetic.

16. The vehicle impact detection apparatus for protecting an object external of the vehicle according to claim 11 wherein a part of the body of the vehicle adjacent the sensor is ferromagnetic.

17. The vehicle impact detection apparatus for protecting an object external of the vehicle according to claim 16 wherein the separate strain element is located in a bumper or door of the vehicle.

18. The vehicle impact detection apparatus for protecting an object external of the vehicle according to claim 17 wherein the bumper or door is made from a plastic material and the strain element is insert molded into the bumper or door.

19. The vehicle impact detection apparatus for protecting an object external of the vehicle according to claim 18 wherein the strain element comprises a strengthening bar.

20. The vehicle impact detection apparatus for protecting an object external of the vehicle according to claim 19 wherein the strengthening bar is in the lower air dam of the bumper structure.

21. A method of analyzing an impact of a vehicle with an object external of the vehicle comprising the steps of:
    (a) providing a magnetostrictive sensor on a vehicle;
    (b) providing a stress conducting member arranged on or forming part of a vehicle;
    (c) providing a control unit;
    (d) arranging the sensor adjacent the stress conducting member;
    (e) sensing stress waves in the stress conducting member caused from the actual occurrence of an impact of an object with a vehicle;
    (f) providing a signal to the control unit; and
    (g) analyzing the signal to determine the location on the vehicle that is impacted by the object and to determine if the object is a vulnerable road user, wherein the vulnerable road user is selected from the group consisting of pedestrians, cyclists, animals, and motorcyclists.

22. The method of analyzing an impact of a vehicle with an object external of the vehicle according to claim 21 wherein the step of analyzing the signal comprises configuring the analysis means so as to determine crash characteristics.

* * * * *